United States Patent [19]

D'Errico et al.

[11] Patent Number: 4,798,713

[45] Date of Patent: Jan. 17, 1989

[54] METHOD OF SELECTIVE REDUCTION OF HALODISILANES WITH ALKYLTIN HYDRIDES

[75] Inventors: John J. D'Errico, Fenton; Kenneth G. Sharp, Midland, both of Mich.

[73] Assignee: Dow Corning Corporation, Midland, Mich.

[21] Appl. No.: 138,620

[22] Filed: Dec. 28, 1987

[51] Int. Cl.$^4$ .............................................. C01B 33/08
[52] U.S. Cl. ...................................... 423/342; 423/341
[58] Field of Search ...................... 423/342, 347, 341; 556/474

[56] References Cited

U.S. PATENT DOCUMENTS

| | | | |
|---|---|---|---|
| 3,043,857 | 7/1962 | Jenkner et al. | 556/474 |
| 3,378,344 | 4/1968 | Horn et al. | 556/474 |
| 3,439,008 | 4/1969 | Berger | 260/429 |
| 4,115,426 | 9/1978 | Hiiro et al. | 260/448.2 |
| 4,617,357 | 10/1986 | Pallie et al. | 525/506 |
| 4,639,361 | 1/1987 | Aono et al. | 423/347 |

OTHER PUBLICATIONS

Grady, et al, J. Org. Chem., vol. 37, pp. 2014–2016 (1969).

Wilt, et al., J. Am. Chem. Soc., vol. 105, pp. 5665–5675, (1983).

*Primary Examiner*—John Doll
*Assistant Examiner*—Lori S. Freeman
*Attorney, Agent, or Firm*—James E. Bittell

[57] ABSTRACT

The invention relates to the selective and sequential reduction of halodisilanes by reacting these compounds at room temperature or below with trialkyltin hydrides or dialkyltin dihydrides without the use of free radical intermediates. The alkyltin hydrides selectively and sequentially reduce the Si-Cl, Si-Br or Si-I bonds while leaving intact the Si-Si and Si-F bonds present.

18 Claims, No Drawings

METHOD OF SELECTIVE REDUCTION OF HALODISILANES WITH ALKYLTIN HYDRIDES

STATEMENT OF GOVERNMENT RIGHTS

The United States Government has rights in this invention pursuant to Subcontract ZL-5-04074-6 under Prime Contract No. DE-AC02-83CH10093 awarded by the U.S. Department of Energy.

BACKGROUND OF THE INVENTION

The present invention relates to the discovery that trialkyltin hydrides and dialkyltin dihydrides display selectivity with respect to both (a) the preferential reduction, under mild conditions, of one halogen to the exclusion of another halogen in a mixed halodisilane with preservation of the silicon-silicon bond and (b) the sequential reduction of halogen atoms in halodisilanes having two or more atoms of the same halogen. The products formed by reducing the halodisilanes in this manner are suitable as precursors for preparing amorphous silicon films for use as semiconductors and protective coatings.

Substitution of hydrogen for chlorine in chlorosilanes such as $(CH_3)SiCl_3$ is known and can be effected via reaction with trialkylsilanes in the presence of catalytic quantities of aluminum chloride. However, this catalyst is notorious in promoting skeletal rearrangements (i.e., redistributions involving Si-C and/or Si-Si bonds). The latter behavior makes this reaction unsuitable for reduction of halodisilanes when one wants to avoid skeletal rearrangements.

Organotin hydrides are known as effective reducing agents in organic chemistry and their reactivity patterns have been well documented. A common use of organotin hydrides is in the reduction of organic halides.

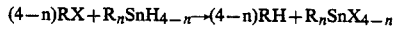

$$(4-n)RX + R_nSnH_{4-n} \rightarrow (4-n)RH + R_nSnX_{4-n}$$

The above reaction has wide scope since R can be alkyl, aryl, acyl, propargyl, etc. The reaction conditions and efficiencies will vary with the R group (e.g., aryl halides are more difficult to reduce than alkyl halides) and with the halide (for alkyl halides the order of reactivity is $RI > RBr > RCl >> RF$). However, these reactions are known to proceed through free radical mechanisms and require the addition of free radical initiators.

U.S. Pat. No. 4,617,357, issued Oct. 14, 1986 to Pallie, et al., teaches the reduction of residual chlorine in glycidyl compounds with certain organotin hydrides without the glycidyl group thereby being attacked.

Grady, et al., J. ORG. CHEM., v. 34, p. 2014–2016, 1969, teaches the use of organotin hydrides for the sequential free radical reduction of organic halides, such as geminal dihalides, and simple carbonyl compounds. Grady, et al., does not teach the sequential or other reduction of halodisilanes, nor does it teach reduction methods in the absence of free radicals.

Organotin hydrides typically react with organic halides and unsaturated bonds via a free radical mechanism. These reactions either require heating or initiation by a free radical source. Free radicals are well known to attack silicon-silicon bonds and are therefore not appropriate reactive intermediates in reductions of disilanes when skeletal arrangements of silicon-silicon bonds are to be avoided.

Hiiro, et al., U.S. Pat. No. 4,115,426, issued Sept. 19, 1978, teaches a method of preparing dialkylchlorosilanes by the sequential reduction of the corresponding dialkyldichlorosilane. The reducing agents in the preparation are sodium borohydride and sodium hydride. Hiiro, et al., does not teach the reduction of silanes which do not contain alkyl groups nor the reduction of halodisilanes.

Similarly, Wilt, et al., J. AM. CHEM. SOC., vol. 105, p. 5665–5675, 1983, teaches the reduction of silicon-containing organic halides by organotin hydrides but is limited to the reduction of alpha-halosilanes (i.e., the halogen atom is bonded to a carbon atom adjacent to a silicon atom but is not bonded directly to a silicon atom).

Aono et al., U.S. Pat. No. 4,639,361, issued Jan. 27, 1987, teaches a process of preparing disilane $Si_2H_6$ from the reduction of hexachlorodisilane $Si_2Cl_6$ with a mixture of LiH and $LiAlH_4$.

U.S. Pat. No. 3,439,008, issued Apr. 15, 1969 to Berger, teaches a method of reacting an organostannane and a halogenated Group IVb elemental material selected from the group consisting of a halosilane, a halogermane, and a halosiloxane. However, Berger requires the presence of a Group III Lewis acid promoter such as $Al_2(CH_3)_6$ and does not teach the selective, sequential reduction of halodisilanes.

Related U.S. patent application entitled Method of Forming Semiconducting Amorphous Silicon Films From the Thermal Decomposition of Fluorohalodisilanes, Ser. No. 064,641, filed June 22, 1987, by the same inventors as this application, describes a use for fluorodisilanes such as those produced by the instant invention. The fluorodisilanes are used as precursors to form semiconducting films of amorphous silicon by a chemical vapor deposition process.

Related U.S. patent application entitled, Method of Selective Reduction of Polyhalosilanes with Alkyltin Hydrides, Ser. No. 078,444, filed July 27, 1987, by the same inventors as this application, discloses a method of reducing halosilanes by reacting at room temperature or below with alkyltin hydrides without the use of free radical intermediates. Alkyltin hydrides selectively and sequentially reduce the Si-Cl, Si-Br, or Si-I bonds while leaving intact any Si-F bonds. When two or more different halogens are present on the halosilane, the halogen with the highest atomic weight is preferentially reduced. However, there is no teaching of the selective, sequential reduction of halodisilanes, in which the easily destroyed silicon-silicon bond is present.

Thus, there exists no known method to effect preferential reduction of one halogen species to the exclusion of another in halodisilanes, such as $SiF_3SiHBr_2$, to enable preparation of fluorodisilanes which are suitable as precursors for preparing amorphous silicon films for use as semiconductors and protective coatings. Further, this method of preferential reduction should not include free radicals or acidic or basic catalysts which are known to attack Si-Si bonds.

SUMMARY OF THE INVENTION

The present invention relates to the selective and sequential reduction of halodisilanes by reacting these compounds at or below room temperature with trialkyltin hydrides or dialkyltin dihydrides without the use of free radical intermediates. Reactions may be conducted with or without solvents for the reactants. Trialkyltin hydrides or dialkyltin dihydrides selectively and sequentially reduce the Si-I, Si-Br or Si-Cl bonds while leaving intact the Si-F and Si-Si bonds. The subject invention may be used for the synthesis of fluorodisilanes of the formulae $Si_2F_xH_{6-x}$, especially where x is 3, 4, or 5. The fluorodisilanes are suitable as precursors for preparing amorphous silicon films for use as semiconductors and protective coatings.

The method of the present invention includes the steps of contacting the halodisilane with a trialkyltin hydride of the formula $R_3SnH$, or dialkyltin dihydride of the formula $R_2SnH_2$, wherein R is a alkyl group containing 1 to 10 carbon atoms, whereby at least one silicon-chlorine, silicon-bromine, or silicon-iodine bond of the halodisilane is reduced to a silicon-hydrogen bond.

DETAILED DESCRIPTION OF THE INVENTION

The present invention relates to a method of selective or sequential reduction of at least one silicon-chlorine, silicon-bromine, or silicon-iodine bond of a halodisilane to a silicon-hydrogen bond. The method comprises contacting a halodisilane with a trialkyltin hydride of the formula $R_3SnH$, or dialkyltin dihydrides of the formula $R_2SnH_2$ wherein R is an alkyl group containing 1 to 10 carbon atoms, whereby at least one silicon-chlorine, silicon-bromine, or silicon-iodine bond of the halodisilane is reduced to a silicon-hydrogen bond, and wherein the silicon-silicon and silicon-fluorine bonds of the halodisilane remain intact.

Either trialkyltin hydrides or dialkyltin hydrides may be used as the reducing agent in the method of this invention. The alkyl substituents of the tin hydrides may contain 1 to 10 carbon atoms so that useful tin hydrides include, for example, trimethyltin hydride, dimethyltin dihydride, tributyltin hydride, dioctyltin dihydride, diisobutyltin dihydride, and tridecyltin hydride. Generally trimethyltin hydride is the preferred reducing agent.

The compounds reduced by the method of the present invention are described generally as halodisilanes. Halodisilanes contain two silicon atoms bonded together with each silicon atom bearing three other substituents. In general the substituents may be all halogen atoms or any mixture of halogen and hydrogen atoms.

The term "fluorohalodisilane" is used in the present invention to designate molecules of the formula $X_mSi_2H_nF_y$, where m is an integer from 1 to 5 inclusive; n is an integer from 0 to 4 inclusive; y is an integer from 0 to 5 inclusive; and the sum of m+n+y is equal to 6. Each X designates a halogen independently selected from the group consisting of Cl, Br, or I. Fluorohalodisilanes which may be reduced in the method of this invention include, for example, completely halogenated disilanes such as $SiF_3SiBr_3$, $SiFBr_2SiBr_3$, $SiF_2ClSiCl_3$, $SiF_3SiI_3$, $SiF_2BrSiF_2Br$, $SiF_2BrSiF_2Cl$, and $SiF_2BrSiF_3$ and partially halogenated disilanes which contain 1 to 4 hydrogen substituents such as $SiFHBrSiBr_3$, $SiF_2HSiCl_3$, $SiF_3SiHI_2$, $SiF_2HSiF_2Br$, $SiFHBrSiF_2Cl$, and $SiH_3SiHFBr$.

A selective reduction for the purposes of the present invention is a reaction where one halogen is preferentially reduced to the exclusion of another halogen in the same molecule. In general, selective reduction is illustrated, for example, by the conversion of $Si_2X'_aX''_b$ to $Si_2X'_{(a-1)}HX''_b$, where the atomic weight of X'>X''. The conversion of $SiF_3SiF_2Br$ to $SiF_3SiF_2H$ is a specific example of selective reduction.

Sequential reduction on the other hand refers to the stepwise reduction of one halogen at a time in a molecule having two or more of the same halogen atoms, for example, the conversion of $Si_2X_aH_{6-a}$ to $Si_2X_{a-1}H_{6-a+1}$, then optionally to $Si_2X_{a-2}H_{6-a+2}$ in a second step. In a sequential reduction, the product isolated still retains at least one halogen substituent which is the same as the halogen removed in the reduction reaction. The conversion of $SiH_3SiBr_3$ to $SiH_3SiHBr_2$ is a specific example of a sequential reduction. It should be apparent that the present invention may also encompass conversions which are both selective and sequential, for example, the conversion of $SiF_3SiBr_3$ to $SiF_3SiHBr_2$.

Organotin hydrides may be employed to convert silicon-halogen bonds to silicon-hydrogen bonds in disilane compounds where the conversion is performed with materials or in a manner that is not selective or sequential. For instance, the conversion of $SiBr_3SiBr_3$ directly to $SiH_3SiH_3$ is neither selective nor sequential. Reduction of halodisilanes with organotin hydrides, however, is especially useful and preferred when a selective or sequential conversion of halogen substituents to hydrogen is desired.

The method of the present invention is applicable to a variety of halodisilanes, and particularly fluorohalodisilanes. The reductions can be carried out in the liquid or vapor (gas) phases, with or without solvent present. Solvents compatible with the reduction chemistry include aromatic hydrocarbons, alkanes, ethers, and chlorofluorocarbons. Protic solvents such as alcohols or highly basic solvents such as amines are incompatible.

Reactions can be conducted over a temperature range of from $-80°$ C. to $100°$ C., but it is preferable to use temperatures from $-80°$ C. to $25°$ C. to obtain increased selectivity and control over the extent of sequential reduction desired.

The fluorohalodisilanes which are preferred materials for selective reduction by the method of this invention can be obtained, for example, from the reactions of difluorosilylene with a hydrogen halide, shown below specifically for reaction with HBr:

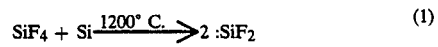

(1)

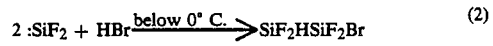

(2)

(3)

Reaction (3) corresponds to the redistribution of the principal product of the reaction, $SiF_2HSiF_2Br$.

Further illustrating the reduction of preferred fluorohalodisilanes, trialkyltin hydride or dialkyltin dihydride reacts with, for example, $SiF_3SiHBr_2$ in the liquid phase to produce a fluorodisilane of the formula $Si_2F_xH_{6-x}$, where x is 3, for example:

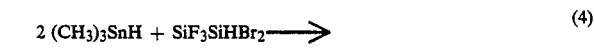

(4)

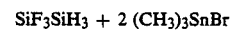

(90% yield)

Thus, according to the present invention, the trialkyltinhydride or dialkyltin dihydride reduces the Si-Br bonds of $SiF_3SiHBr_2$ to form essentially $SiF_3SiH_3$ without affecting the Si-Si or Si-F bonds. Additionally, when the reaction is conducted at low temperatures, the product of the first reduction step, $SiF_3SiH_2Br$, can readily be detected.

A comparable reaction with a commonly used reducing agent, Vitride ™ ($NaAlH_2(OCH_2CH_2OCH_3)_2$), conducted under similar conditions resulted in both the Si-Br and Si-F bonds being reduced, producing $SiH_4$, $SiF_3H$, and $SiF_4$. Silicon-silicon bonds were destroyed, since there were no disilanes observed in the mixture of products. Similarly, a comparable reduction using DI-BAL ™ ($i-Bu_2AlH$) reducing agent also resulted in both the Si-Br and Si-F bonds being reduced, producing $SiF_4$ and $SiF_3H$. There also were no disilanes observed in the product mixture.

This example illustrates the mildness, selectivity, and sequential nature of the alkyltin hydride reduction of silicon- and halogen-containing materials which contain fluorine and another halogen selected from the group consisting of chlorine, bromine or iodine.

The methods of the present invention could be conducted by those skilled in the art under static or dynamic conditions, at elevated or cooled reaction temperatures using reactants in the vapor, or liquid phases, with or without the presence of solvents. The methods of the present invention are useful in preparing partially reduced halodisilanes which are useful for the generation of amorphous silicon semiconducting films and films for the protection of surfaces by chemical vapor deposition (CVD) and plasma enhanced CVD.

EXAMPLES

The majority of the following examples was performed on a high vacuum line at room temperature. Each reactant was allowed to expand into a constant volume to a specific pressure, typically 10 to 20 torr. The progress of the reactions was monitored by the appearance of bands in the Si-H stretching region of the infrared spectrum (2400–2000 cm$^{-1}$), as well as by the disappearance of the Sn-H stretches (1900–1750 cm$^{-1}$). Both of these regions are free of interferences such as combination and overtone bands. The frequencies cited in the Examples refer to the Si-H stretch. The predominant tin-containing by-products of these reactions were shown to be $(CH_3)_3SnBr$ and $(CH_3)_3SnCl$ by their $^1H$ nmr and IR spectra.

EXAMPLE 1

REDUCTION OF $SiF_3SiHBr_2$ WITH $(CH_3)_3SnH$

One equivalent (typically 0.2 mmoles) of $SiF_3SiHBr_2$ was condensed in a trap with two equivalents of $(CH_3)_3SnH$. The mixture was allowed to warm to room temperature for 30 minutes. An IR spectrum indicated that all of the $SiF_3SiHBr_2$ had been consumed, but a small amount of $(CH_3)_3SnH$ remained unreacted. $SiBr_4$ was added to react with the excess $(CH_3)_3SnH$ (room temperature, 1 hr). The mixture was then passed through a trap cooled to −95° C. (toluene) into a trap cooled to −196° C. The material trapped at −196° C. was pure $SiF_3SiH_3$ (90% yield). This compound was identified by its IR and $^1H$ and $^{19}F$ nmr spectra. This example illustrates a selective reduction using the method of the present invention.

EXAMPLE 2

REDUCTION OF $SiF_3SiFHBr$ WITH $(CH_3)_3SnH$

Equimolar quantities of $SiF_3SiFHBr$ (a small amount of $SiF_3SiF_2H$ was present in the $SiF_3SiFHBr$) and $(CH_3)_3SnH$ were allowed to react at room temperature for 10 minutes. An IR of the mixture indicated that all of the $SiF_3SiFHBr$ had been consumed. The products consisted of a mixture of $SiF_3SiF_2H$ (Si-H, 2230 cm$^{-1}$) and $SiF_3SiH_3$ (Si-H, 2189, 2178 cm$^{-1}$) in an approximately 1:1 molar ratio.

Equimolar quantities of $SiF_3SiFHBr$ and $(CH_3)_3SnH$ were condensed into a 5 mm medium wall nmr tube which contained toluene-d8. The nmr tube was flame sealed and stored at −196° C. $^{19}F$ nmr spectra of the reaction mixture were recorded as the tube was allowed to gradually warm up. There was a small amount of $SiF_2HSiF_2Br$ present as an impurity. The temperature was maintained at −80° C. for 3 hours, −60° C. for 1 hour, −30° C. for 45 minutes, and 10° C. for 10 minutes. After the mixture was held at −80° C. for 30 minutes, the nmr spectrum contained peaks due to $SiF_3SiFHBr$ (major), $SiF_3SiH_3$, $SiF_3SiF_2H$, $SiF_3SiHBr_2$, and a small amount of the new compound $SiF_3SiH_2Br$. After 2 hours at −80° C., there was much less $SiF_3SiFHBr$ present, while the amounts of $SiF_3SiH_3$, $SiF_3SiF_2H$, and $SiF_3SiHBr_2$ increased. The peaks due to $SiF_3SiH_2Br$ were still evident. This same pattern was seen to continue after the mixture had been held at −60° C. for 25 minutes. Finally, after the mixture was held at 10° C. for 10 minutes, the major products were $SiF_3SiH_3$ and $SiF_3SiF_2H$, with small amounts of $SiF_3SiFHBr$ and $SiF_3SiHBr_2$ remaining. This example illustrates a selective reduction accompanied by redistribution of the reduction product.

EXAMPLE 3

The REDUCTION OF $SiF_2HSiF_2Br$ WITH $(CH_3)_3SnH$

Equimolar amounts of $SiF_2HSiF_2Br$ and $(CH_3)_3SnH$ were allowed to react at room temperature for 10 minutes. An IR spectrum of the mixture indicated that all of the $SiF_2HSiF_2Br$ had been consumed. The major products of the reaction were $SiF_3SiF_2H$ (Si-H, 2230 cm$^{-1}$) and $SiF_3SiH_3$ (Si-H, 2189, 2178 cm$^{-1}$).

Equimolar quantities of $SiF_2HSiF_2Br$ and $(CH_3)_3SnH$ were condensed into a 5 mm medium wall nmr tube with toluene-d8. The nmr tube was flame sealed and stored at −196° C. $^{19}F$ nmr spectra of the reaction mixture were recorded as the tube was allowed to gradually warm up. After the tube was allowed to warm to −60° C., the only peaks observed were those due to $SiF_2HSiF_2Br$ and a small amount of $SiF_3SiF_2H$ present as an impurity. The sample was then warmed to −40° C. for 20 minutes. The peaks due to $SiF_2HSiF_2Br$ decreased while those due to $SiF_3SiF_2H$ increased. There were also small amounts of $SiF_2HSiF_2H$, $SiF_3SiFHBr$, $SiF_3SiHBr_2$, and $SiF_2BrSiFHBr$ observed in the mixture. There was a quartet centered at −114.7 ppm (relative to external $CFCl_3$) with $J_{FSiSiH}=6.9$ Hz. Both the chemical shift and coupling constant are consistent with the new compound $SiF_2BrSiH_3$. After the mixture was held at −25° C. for 35 minutes, the peaks due to $SiF_2HSiF_2Br$ continued to decrease while those due to $SiF_3SiF_2H$ increased. There were now significant amounts of $SiF_3SiFHBr$ and $SiF_2BrSiFHBr$ present in the mixture, while $SiF_2BrSiH_3$, $SiF_2HSiF_2H$, and $SiF_3SiHBr_2$ also increased. A new compound (triplet centered at −122.9 ppm with $J_{FSiSiH}=7.7$ Hz) also appeared at this point. This chemical shift and coupling constant are consistent with the molecule $SiF_3SiH_2Br$.

Most of the $SiF_2HSiF_2Br$ was gone after the mixture had been held at 10° C. for 20 minutes. The main constituents at this point are $SiF_3SiF_2H$ and $SiF_3SiFHBr$. The amounts of $SiF_2HSiF_2H$ and $SiF_2BrSiFHBr$ decreased, while $SiF_2BrSiH_3$, $SiF_3SiHBr_2$, and $SiF_3SiH_2Br$ increased. After 20° C. for 10 minutes, the main products of the reaction were $SiF_3SiF_2H$ and $SiF_3SiH_3$. The starting material was completely consumed, but there were still small amounts of $SiF_3SiHBr_2$, $SiF_3SiH_2Br$, $SiF_3SiFHBr$, and $SiF_2HSiF_2H$ present in the mixture. This example illustrates a selective reduction accompanied by redistribution of the reduction product.

EXAMPLE 4

The REDUCTION OF $SiF_3SiHCl_2$ WITH $(CH_3)_3SnH$

One equivalent of $SiF_3SiHCl_2$ (ca. 0.1 mmole) was condensed in a trap with two equivalents of $(CH_3)_3SnH$. The mixture was allowed to warm to room temperature for one hour. An IR spectrum indicated the presence of $SiF_3SiH_3$ (90%), together with a small amount of $SiF_3H$.

EXAMPLE 5

The REDUCTION OF $SiF_2HSiF_2Cl$ WITH $(CH_3)_3SnH$

Equimolar quantities (ca. 0.1 mmole, each) of $SiF_2HSiF_2Cl$ and $(CH_3)_3SnH$ were condensed into a trap and allowed to warm to room temperature. An IR spectrum obtained of the mixture after 10 minutes at room temperature indicated that all of the products had been consumed. The products consisted of $SiF_3SiF_2H$ and $SiF_3SiH_3$ (ca. 1:1 molar ratio), together with a small amount of $SiF_4$. This example illustrates a selective reduction using the method of the present invention.

EXAMPLE 6

REDUCTION OF $SiF_3SiHBr_2$ USING VITRIDE TM $SiF_3SiHBr_2$ (0.15 mmole) was condensed into a flask at −196° C. and then warmed to −80° C. A solution of $NaAlH_2(OCH_2CH_2OCH_3)_2$ (0.15 mmole, Vitride TM) in 15 ml of toluene was added in portions over a 30 minute period. At this point, the mixture was pumped on dynamically in order to remove any volatile compounds which may have formed. However, none were observed. The reaction flask was sealed and the mixture was allowed to warm to room temperature for approximately 15 minutes. The mixture was again cooled to −80° C. and the volatile compounds were pumped off. An IR spectrum of the volatile material indicated the presence of $SiH_4$, $SiF_3H$, and $SiF_4$. There were no disilanes observed in the mixture.

EXAMPLE 7

REDUCTION OF $SiF_3SiHBr_2$ USING DIBAL TM

Approximately 0.2 mmole $SiF_3SiHBr_2$ were condensed into a flask at −196° C. This mixture was then allowed to warm to −80° C., at which point 0.2 mmole diisobutylaluminum hydride (DIBAL TM) in toluene was added in portions over 30 minutes. After the addition was complete, the mixture was pumped on in order to remove any volatile species, but none were observed. The mixture was allowed to warm to room temperature for 15 minutes and then cooled to −80° C. The only volatile material obtained consisted of $SiF_4$ and $SiF_3H$. There was no evidence of disilanes in the mixture.

That which is claimed is:

1. A method of reduction of a silicon-halogen bond of a halodisilane to a silicon-hydrogen bond wherein each halogen of the halodisilane is independently selected from the group consisting of fluorine, chlorine, bromine, and iodine, and wherein when there are two or more different halogens present, the halogen with the highest atomic weight is preferentially reduced by contacting said halodisilane with a trialkyltin hydride or dialkyltin dihydride of the formula $R_3SnH$ or $R_2SnH_2$, respectively, wherein R is an alkyl group containing 1 to 10 carbon atoms.

2. A method of reduction of at least one of the silicon-X bonds of a fluorohalodisilane to a silicon-hydrogen bond, wherein the fluorohalodisilane is of the formula $X_mSi_2H_nF_y$, where m is an integer from 1 to 5 inclusive; n is an integer from 0 to 4 inclusive; y is an integer from 1 to 5 inclusive; the sum of $m+n+y$ is equal to 6; and each X is independently selected from the group consisting of chlorine, bromine, and iodine, said method comprising contacting the fluorohalodisilane with a trialkyltin hydride or dialkyltin dihydride of the formula $R_3SnH$ or $R_2SnH_2$, respectively, wherein R is an alkyl group containing 1 to 10 carbon atoms, whereby at least one silicon-X bond of the fluorohalodisilane is reduced to a silicon-hydrogen bond.

3. A method according to claim 2, wherein the reduction of the silicon-X bond is selective and wherein the silicon-fluorine bonds and the silicon-silicon bond of the fluorohalodisilane remain intact.

4. A method according to claim 3, wherein X is bromine.

5. A method according to claim 3, wherein X is chlorine.

6. A method according to claim 3, wherein X is iodine.

7. A method according to claim 3, wherein the fluorohalodisilane is contacted with a trialkyltin hydride which is $(CH_3)_3SnH$.

8. A method according to claim 7, wherein $SiF_3SiHBr_2$ is reduced to $SiF_3SiH_3$.

9. A method according to claim 2, wherein $SiF_3SiFHBr$ is reduced and the product of the reduction undergoes redistribution to form $SiF_3SiH_3$ and $SiF_3SiF_2H$.

10. A method according to claim 2, wherein $SiF_2HSiF_2Br$ is reduced and the product of the reduction undergoes redistribution to form $SiF_3SiH_3$ and $SiF_3SiF_2H$.

11. A method according to claim 1, wherein the halodisilane contains two or more different halogens independently selected from the group consisting of fluorine, chlorine, bromine, and iodine.

12. A method according to claim 2, wherein $SiF_2HSiF_2Cl$ is reduced and the product of the reduction undergoes redistribution to form $SiF_3SiH_3$ and $SiF_3SiF_2H$.

13. A method according to claim 2, wherein $SiF_3SiFHCl$ is reduced and the product of the reduction undergoes redistribution to form $SiF_3SiH_3$ and $SiF_3SiF_2H$.

14. A method according to claim 7, wherein $SiF_3SiHCl_2$ is reduced to $SiF_3SiH_3$.

15. A method according to claim 2, wherein the reduction is conducted at or below room temperature.

16. A method according to claim 2, wherein the reduction is conducted in the liquid phase without solvent present.

17. A method according to claim 2, wherein the reduction is conducted in the liquid phase with solvent present.

18. A method according to claim 2, wherein the reduction is conducted in the gas phase.

* * * * *